United States Patent Office 3,437,500
Patented Apr. 8, 1969

3,437,500
URETHANE OILS
Hans Joachim Hennig, Cologne-Stammheim, and Erwin Windemuth and Erich Zankl, Leverkusen, Germany, assignors to Farbenfabriken Bayer Aktiengesellschaft, Leverkusen, Germany, a corporation of Germany
No Drawing. Filed Nov. 22, 1965, Ser. No. 509,153
Claims priority, application Germany, Nov. 20, 1964, F 44,481
Int. Cl. C09d 3/72; C08f 19/14
U.S. Cl. 106—252                          7 Claims

ABSTRACT OF THE DISCLOSURE

Urethane oils which are the reaction product of a polyhydroxyl polyester having ethylenic unsaturation and an isocyanurate which has free NCO groups. The urethane oils have improved properties, particularly good resistance to abrasion and low tendency toward chalking. In addition, they harden rapidly and are resistant to yellowing.

---

This invention relates to urethane oils which have improved resistance to many of the degradative forces which hindered the use of the urethane oils.

The preparation of drying and semi-drying oils which are modified with polyisocyanates, so-called urethane oils or urethane alkyds, by reacting hydroxyl group containing esters of unsaturated fatty acids with polyisocyanates, especially diisocyanates, is already known.

Urethane oils or urethane alkyds used as raw materials for lacquers have considerable advantages over untreated, boiled or blown drying oils, stand oils or drying alkyd resins which have been modified with dicarboxylic acids. Careful treatment, for example, with chlorophenylene-2,4-diisocyanate according to DRP 738,254 or toluylene diisocyante according to U.S. Patent 2,970,062 imparts to the lacquer films more rapid surface drying and complete drying, greater hardness of the films, considerably greater resistance to water, chemicals and solvents, greater pigment binding ability and better pigment wetting, higher abrasion resistance and satisfactory compatibility with basic pigments and with metal powders. However, these reactions have the distinct disadvantage that they cause pronounced yellowing of the films obtained when these compounds are applied as paints. Yellowing on exposure to light is considerable and so disturbing that, for example, white lacquers, lacquers in pastel colors or in blue tints cannot be produced. In addition, the usual diisocyanates used for the preparation of urethane oil increase the tendency of oils or their fatty acids to turn dark yellow. Another disadvantage is the fact that urethane oils or urethane alkyds which dry fairly rapidly on the surface take a long time to harden right through the thickness of the film and in that respect are similar or even inferior to the usual alkyd resins.

These disadvantages can be partly overcome by using aliphatic diisocyanates such as hexane-1,6-diisocyanate for the preparation of the urethane oils or urethane alkyds. It is in fact observed that after formation of the films, the paints manifest better behavior in the light but on the other hand, oils modified in this way take such a long time to dry without tackiness, in some cases even weeks, that it is impossible to use them in practice.

It is therefore an object of this invention to provide urethane oils and processes for their preparation which do not have the foregoing disadvantages. Another object of this invention is to provide urethane oils which have improved resistance to yellowing. A further object of this invention is to provide urethane oils which have improved resistance to chalking. Still a further object of this invention is to provide urethane oil coating compositions which cure to their final hardness level in a short time. A further object of this invention is to provide an improved process for the preparation of urethane oils. Another object of this invention is to provide urethane oils which have low abrasion properties.

The foregoing objects and others which will become apparent from the following description are accomplished in accordance with the invention, generally speaking, by providing urethane oils based on isocyanurates which have free NCO groups and an hydroxyl polyester having ethylenic unsaturation. The isocyanurates are prepared by trimerizing the NCO groups of an organic polyisocyanate and preferably an organic diisocyanate. The hydroxyl polyesters are prepared by reacting a polyhydric alcohol with a polycarboxylic acid, one or more of reactants containing ethylenic unsaturation or the polyester is prepared from a saturated polycarboxylic acid, a saturated polyhydric alcohol and fatty acids or monohydric alcohols which contain some ethylenic unsaturation. Thus, it has now been found, surprisingly, that urethane oils or urethane alkyds with improved properties are obtained by using polyisocyanates which contain at least one isocyanurate group as an essential structural element. The improvemnt lies in a considerable resistance to yellowing in films of paint exposed to light, rapid hardening, low abrasion and reduced tendency to chalking and in addition, the fact that the film reaches its final hardness relatively shortly after it has completely dried.

The subject of the invention is thus the preparation of urethane oils or urethane alkyds by reacting hydroxyl group containing esters preferably of ethylenically unsaturated fatty acids and polyhydric alcohols or ester interchange products of drying and/or semi-drying vegetable oils or fatty acid triglycerides and polyhydric alcohols with polyisocyanates, which process is characterized in that the polyisocyanates used are polyisocyanates which have an isocyanurate structure. In the simplest cases, they can be represented by the general formula.

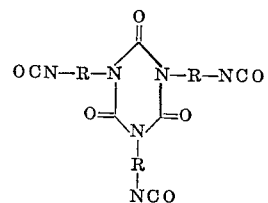

in which R denotes the same or different bivalent hydrocarbon radicals, which may be substituted or also contain hetero atoms, or the group

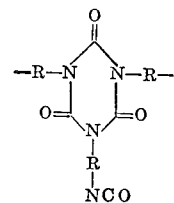

The radical R in the foregoing formulas may be obtained by the removal of the NCO groups from any suitable organic diisocyanate as more particularly set forth below. Not all of the isocyanurates having free NCO groups can be accurately represented by formula since many of them are polymeric materials resulting from the random trimerization of isocyanate groups of organic polyisocyanates. It is preferred to use an organic diisocyanate for the preparation of the isocyanurate which is prepared by heating the diisocyanate in the presence of a trimerization catalyst such as triethyl phosphine, potassium acetate, sodium formate, sodium carbonate, sodium methoxide, triethyl amine, oxalic acid, titanium ethyl butyrate and the like. In accordance with a preferred embodiment of the invention a trimer is prepared from 2,4-toluene diisocyanate or from a technical isomer mixture of 2,4- and 2,6-toluene diisocyanate. In accordance with another preferred embodiment of the invention, a trimer is prepared from a mixture of an alkyl benzene diisocyanate and an aliphatic diisocyanate. The mixture preferably contains from about 60 to 95% alkyl benzene diisocyanate and the balance an aliphatic diisocyanate. The preferred aromatic isocyanate is toluylene-2,4-diisocyanate and toluylene-2,6-diisocyanate. The preferred aliphatic diisocyanate is 1,6-hexane diisocyanate, but 1,4-butane diisocyanate and bis(methyl isocyanato)cyclobutane are also often used to advantage.

Thus according to the invention it is possible to use triisocyanates which have an isocyanurate group such as is obtained in known manner by the joining together of 3 mols of diisocyanate or alternatively it is possible to use high molecular weight and thus higher functional polyisocyanates which have an isocyanurate structure, for example a hexa-isocyanate of molecular weight 1566 such as is obtained by polymerization of about 9 mols of toluylene diisocyanate.

In addition, polyisocyanates which have at least one isocyanurate group, such as are obtained by polymerization of diisocyanate mixtures by joining together of different diisocyanates or those in which small quantities of mono- and triisocyanates are included in the process of their preparation are also suitable.

The following are examples of suitable isocyanates for use as starting materials for the preparation of the polyisocyanates with isocyanurate structure. Butane-1,4-diisocyanate, hexane-1,6-diisocyanate, cyclohexane-1,4-diisocyanate, dicyclohexylmethane-4,4'-diisocyanate, diphenylmethane - 4,4'-diisocyanate, diphenyl-dimethylmethane-4,4' - diisocyanate, 1 - chlorobenzene-2,4-diisocyanate, 3-methyldiphenylmethane-4,4'-diisocyanate, 1 - methyl - 3,5, 6-chlorobenzene-2,4-diisocyanate, perchloro-meta-phenylene diisocyanate, allyl isocyanate, ω-chloro-n-hexane isocyanate, cyclohexylisocyanate, stearylisocyanate, phenylisocyanate, para-methoxyphenylisocyanate, 1-methyl-benzene-triisocyanate, naphthalene triisocyanate, triphenylmethane-4,4',4''-triisocyanate and phosphoric acid tris-(4-isocyanate phenyl ester).

However, it is preferred to use low molecular weight tri-, tetra- and penta-functional polyisocyanates of isocyanurate structure which are derived from benzene-1-alkyl-2,4-diisocyanates. Among these compounds, polymerization products of toluylene-2,4-diisocyanate or of mixtures of toluylene-2,4-diisocyanate and toluylene-2,6-diisocyanate with an isocyanate content of between about 17.2 and 24.1% or polymerization products of mixtures of toluylene diisocyanate and certain amounts of aliphatic diisocyanates such as hexane-1,6-diisocyanate have proved to be useful because they are readily available commercially.

It is preferred to use polyisocyanates with isocyanurate structure which do not contain more than 0.5% of free, non-trimerized diisocyanate as starting compound from their process of preparation.

It may be mentioned here that polyisocyanates to be used according to the invention having at least one isocyanurate group can also be obtained by other customary methods, for example, by polymerization of monoisocyanates which contain nitro groups to form nitroisocyanurates, followed by conversion of the nitro group into an isocyanate group, or starting from isocyanic acid.

The polyisocyanates with isocyanurate structure to be used according to the invention are either colorless to yellow viscous liquids or preferably resins with melting points up to about 250° C. and more.

The preparation of the urethane oils can be divided into two main separate stages, namely the preparation of the hydroxyl-group containing esters of acids and alcohols one portion of the components containing ethylenic unsaturation and preferably of unsaturated fatty acids and their subsequent reaction with the polyisocyanates used according to the invention.

The hydroxyl polyesters may be based on any suitable polycarboxylic acid such as adipic acid, sebacic acid, or the like with any suitable polyhydric alcohol such as 1,4-butane diol, ethylene glycol, 1,6-hexane diol and the like provided, however, that some ethylenically unsaturated components are included. For example, ethylenically unsaturated polycarboxylic acid components such as maleic acid, alpha-hydromuconic acid or the like or ethylenically unsaturated polyols such as 3-butene-1,2-diol, and the like. But it is preferred to include an ethylenically unsaturated acid in the preparation of the polyester, oleic acid, maleic acid and the like. The most preferred ester for the preparation of the urethane oils of the invention are esters of ethylenically unsaturated fatty acids and polyhydric alcohols as well as ester interchange products of drying or semi-drying vegetable oils or fatty acid triglycerides and polyhydric alcohols.

To prepare the hydroxyl group containing esters, either drying or semi-drying, i.e. ethylenically unsaturated oils such as linseed oil, perilla oil, wood oil, oiticica oil, ricinene oil, i.e. dehydrated castor oil, cotton seed oil, safflower oil, sunflower oil, hemp oil, tall oil, soya bean oil, walnut oil, sesame oil, rape oil or poppy seed oil as well as mixtures of these oils, if desired with the inclusion of non-drying oils such as olive oil, fish oil or ground nut oil are made to undergo ester interchange in known manner with polyhydric alcohols, hydroxycarboxylic acids and/or amino alcohols such as, for example glycols of the general formula

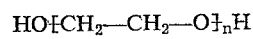

and

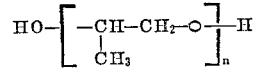

in which $n$ is 1 to 150, butane-1,3-diol, pentaglycol, hexane-1,6-diol, glycerol, trimethylolpropane, trimethylolethane, 1,2,6-hexane triol, pentaerythritol, sorbitol, methyl glucoside, lactic acid, tartaric acid, citric acid, salicylic acid, triethanolamine, N-methyl-diethanolamine, preferably with the addition of an ester interchange catalyst such as an alkali, lead oxide, titanium tetrabutylate, lithium naphthenate, the reactants being heated to 150 to 300° C., mixtures of the starting materials and the partial esters being produced in proportions corresponding to the chosen proportions of oil to polyol. Alternatively, natural or synthetic unsaturated fatty acids such as linoleic, linolenic or oleic acid or mixtures of these fatty acids are esterified in known manner with polyhydric alcohols, if desired with the inclusion of certain proportions of hydroxy- and/or mono- or polycarboxylic acids to produce the hydroxyl group containing esters.

Profound modifications of the hydroxyl group containing starting materials are achieved by adding short-chained diols such as 1,4-butane diol, 1,6-hexane diol or long-chained diols such as polyethylene glycol ethers having molecular weights between about 500 and 2000, thioethers or polyesters as well as amines and/or water, the final result being the obtaining of harder or more elastic films.

For the process according to the invention of the reaction of hydroxyl group containing polyesters with polyisocyanates of isocyanurate structure, it has been found preferable in the case of an ester interchange of vegetable glycerides to choose the proportion of oil to polyol so that according to calculation the main product is an ester interchange product having an hydroxyl content of between about 1.5 and 5%. Otherwise, there is a risk that cross-linked and inevitably insoluble urethane oils will be obtained. When higher molecular weight and hence higher functional polyisocyanates of isocyanurate structure are used as reactants, it is necessary, in order to avoid complete cross-linking, either to reduce the hydroxyl content of the ester interchange product or to keep the OH content unaltered and regulate the functionability by using diols instead of triols in the ester interchange reaction, or add mono-functional alcohols such as methanol, cyclohexanol or oleyl alcohol in the urethanization of the hydroxyl group containing starting materials.

By a preliminary reaction of a higher functional polyisocyanate of isocyanurate structure with short and long chained monohydric alcohols such as ethanol or oleyl alcohol it is also possible to diminish a high functionality of the polyisocyanate and thus inevitably influence its properties such as solubility and compatibility.

It is also possible to react polyisocyanates with isocyanurate structure with the ester-interchanged oils in reaction mixtures containing small proportions of mono- and diisocyanates which should as far as possible be light fast. A wide variety of modifications and hence alterations in the spectrum of properties of the end product can thus be achieved.

If the polyisocyanates with isocyanurate structure are high melting resins which are soluble only in polar solvents, it is generally necessary to carry out the reaction according to the invention in solution. One may use polar solvents which are inert to isocyanates, e.g. ethyl acetate, butyl acetate, dioxane, tetrahydrofuran, methyl ethyl ketone, methylisobutylketone, methyl glycol ether acetate and ethyl glycol ether acetate, high boiling solvents being preferable. According to a preferred method of carrying out the process, after displacement of the atmospheric oxygen by an inert protective gas such as nitrogen or carbon dioxide, a solution of the polyisocyanate in a polar solvent, in as high a concentration as possible, is heated to temperatures between about 40° and 200° C. and reacted with preferably the equivalent quantity of the hydroxyl compound which has also been heated. To prevent precipitation of the polyisocyanate, the hydroxyl compound may have to be added in successive portions. The reaction of the hydroxyl groups with the isocyanate groups to form urethane bonds manifests itself by a considerable evolution of heat with increase in temperature. Since heat is removed by boiling of the solvent, overheating of the reaction mixture can be avoided. As soon as a partial urethane formation has taken place, the reaction mixture is compatible with non-polar solvents such as aliphatic and aromatic hydrocarbons, the preferred solvents in the chemistry of lacquers, as well as mineral oils which are not added according to the desired solids content and viscosity.

It is also possible to remove residual isocyanate groups by adding mono- and polyfunctional compounds such as alcohols, amines or water in this addition at the same time brings about a modification of the urethane oils, for example, by formation of urea groups in the case where water is added.

According to a further method of carrying out the process, the two reaction components can be combined without the use of solvents and heated to temperatures above the melting point of the polyisocyanate of isocyanurate structure, the components then reacting with each other to form a homogeneous phase.

Although the hydroxyl compounds and polyisocyanates are generally reacted in equivalent quantities in the process according to the invention, it is possible, for the purpose of modifying the properties of the lacquer films to use polyisocyanates in less or greater than equivalent amounts, i.e. in a ratio of NCO to OH of about 0.8 to 1.5, less than equivalent amounts leading to soft films and excess amounts leading to harder films.

Owing to the fact that they are practically colorless and owing to their extremely short drying and hardening time, the urethane oils and urethane alkyds obtained according to the invention are particularly suitable as binders for the production of clear and pigmented lacquers, primers, varnishes, printing dyes, colored pastes, putties and fillers as well as adhesives, e.g. adhesives used for flock printing. They can be diluted with the usual organic solvents, pigmented, dried and combined with other film-forming substances, plasticizers, synthetic and natural resins.

Whereas paints made from the usual urethane oils or urethane alkyds take several days and in some cases weeks to harden out completely with oxidation, films from the urethane oils or urethane alkyds obtained according to the invention reach their final hardness within about 48 hours.

In addition to their reduced tendency to chalking, their excellent resistance to yellowing under the action of light is their most striking feature and in this they are distinguished from the usual urethane oils and urethane alkyds.

It is sometimes desirable in order to shorten the reaction time of the isocyanurate containing free isocyanate groups with the hydroxyl polyester to employ a catalyst to speed the reaction of the NCO groups with the hydroxyl groups of the hydroxyl polyester. Suitable catalysts for this reaction include organic metallic compounds, tertiary amines and the like. The preferred organic metallic compounds are the tin salts of carboxylic acids such as stannous octoate, stannous oleate, dibutyl tin dilaurate and the like, but other organic metal compounds may be used such as titanium tetrabutylate, iron acetyl acetonate, lead octoate and the like. Tertiary amines include compounds such as triethyl amine, triethylene diamine, N-methyl morpholine, N-ethyl morpholine and the like.

It is also desirable to include a drying catalyst in the urethane oils such as lead naphthenate, cobalt naphthenate, magnesium naphthenate or a mixture of these drying catalysts.

The urethane oils of the invention are particularly useful for the preparation of coatings which are resistant to yellowing, abrasion, chalking and the like and may be applied to wood, metal or any other suitable substrate.

The invention is further illustrated by the following examples in which parts are by weight unless otherwise specified.

EXAMPLE 1

About 1 mol of ricinine oil and about 1 mol of soya bean oil are heated for about 5 hours at about 230° C. with about 1.2 mols of trimethylolpropane in the presence of about 0.5% by weight of lithium naphthenate. The hydroxyl content of the ester interchange product is about 3.52%.

About 100 parts of this ester interchange product are treated with about 50 parts of methyl glycol ether acetate, heated to about 140° C. and reacted with a solution, also heated to about 140° C., of about 31.5 parts of monomer-free isocyanurate polyisocyanate which has been prepared by polymerization of toluylene-2,4-diisocyanate and which has an NCO content of about 22.1% and about 3.5 parts of hexane-1,6-diisocyanate in about 50 parts of methyl glycol ether acetate. Heating of the reaction mixture is continuous until isocyanate can on longer be detected. After distilling off about 32.5 parts of solvent at reduced pressure, about 67.5 parts of white spirit are added. The clear golden yellow solution has a viscosity of about 2680 cp./25° C.

The approximately 50% solution, composed of about 68% of a mixture of ricinine oil and soya bean oil (1:1), about 6.2% trimethylolpropane, about 23.2% isocyanurate-polyisocyanate in white spirit/methyl glycol acetate (1:1) is mixed with Co-Pb-Mn naphthenate. The proportion of drying agent is about 0.015% Co., 0.22% Pb and about 0.015% Mn, calculated as metal based on the solvent-free product (clear lacquer 1a).

For the purpose of comparison, a solution is used which has been dehydrated in the same way and has the same solids content and solvent mixture and which is the solution of a product composed of about 65% of a mixture of ricinine oil and soya bean oil (1:1), about 12% of trimethylolpropane and about 23% of toluylene diisocyanate (about 8/20) (clear lacquer 1b). Both products contain substantially the same amount of oil and can therefore be compared with each other.

The film hardness is determined on painted films of about 35μ in thickness using a pendulum instrument according to König (DIN 53157).

|  | After 1 day | After 4 days | After 10 days |
| --- | --- | --- | --- |
| Clear lacquer 1a Pendulum hardness (in seconds) | 47 | 52 | 52 |
| Clear lacquer 1b Pendulum hardness (in seconds) | 28 | 38 | 52 |

Compared with clear lacquer 1b, the clear lacquer 1a shows the effect of very rapid film formation and accordingly produces painted films which have already acquired their final surface hardness after slightly more than about 24 hours; clear lacquer 1b leads to films which harden relatively slowly and which acquire their maximum surface hardness only after more than about 192 hours.

Painted films of the clear lacquers 1a and 1b (about 35μ thickness of the dry film) on white paper are exposed for about 88 hours in a fadeometer and about 3 days to a xenon lamp.

The values obtained for the degree of yellowing after this time, determined with the aid of the yellowing scale (DIN 6167) are as follows:

Clear lacquer 1a, G01=no yellowing
Clear lacquer 1b, >G61=very strong yellowing

Painted films made with white lacquers which have been produced from clear lacquers 1a and 1b and which contain about 60% of titanium dioxide (rutile) calculated on the amount of binder are exposed for about 180 hours in a weatherometer. White lacquer 1a shows about 25% of the maximum possible amount of chalking, determined with the aid of a non-standardized scale, whereas white lacquer 1b shows about 50% and is thus twice as liable to chalking.

EXAMPLE 2

About 876 parts (1 mol) of linseed oil and about 90 parts (1 mol) of butane-1,3-diol with the addition of about 0.48 part of lithium-naphthenate are heated under nitrogen for about 5 hours at about 230° C. to give an ester interchange product having an OH number of about 115.

About 200 parts of this reaction product, about 180 parts of methyl glycol ether acetate, about 0.28 part of stannous octoate are heated for about one hour at about 120° C. with a solution of about 76.4 parts of isocyanurate polyisocyanate (NCO content about 22.4%) obtained by polymerization of an isomeric mixture of toluylene-2,4-diisocyanate and toluylene-2,6-diisocyanate in the ratio of about 65:35 parts in about 90 parts of methyl glycol ether acetate until free isocyanate can no longer be detected. In place of about 209.2 parts of solvent which has been distilled off, about 215.6 parts of white spirit are added so that the solution, which has a solids content of about 50%, contains about 39% of white spirit and about 11% of methyl glycol ether acetate (lacquer 2a).

As a product used for comparison, about 200 parts of ester interchange product and about 35.4 parts of a 65:35 isomeric mixture of toluylene-2,4-diisocyanate and toluylene-2,6-diisocyanate are reached in an analogous manner, the solvent is removed quantitatively by distillation and about a 60% solution in white spirit is made up (lacquer 2b).

On comparing these two products, in the preparation of which the same proportion of free isocyanate is reacted, the painted films of clear lacquers (solids content and dehydration as in Example 1) show that lacquer 2a is appreciably superior to lacquer 2b as regards drying, film hardness, abrasion resistance and fastness to light.

|  | Lacquer 2a | Lacquer 2b |
| --- | --- | --- |
| Drying (35μ): |  |  |
| Dust free (after Garmsen) | 30 minutes | >300 minutes. |
| Non-tacky (test with finger) | 60 minutes | >300 minutes (cannot be measured). |
| Pressure resistance (test with finger) | 3 hours | Slightly tacky after 3 hours. |
| Film hardness (35μ): DIN 53157 (after 10 days) (pendulum instrument after König) | 62 seconds | 9 seconds. |
| Abrasion resistance: |  |  |
| Weight loss in the Taber abrader after 1,000 revolutions | After 10 days | After 10 days. |
| CS 10 grinding rollers and 1 kg. load | 55 mg | Not measurable because film too soft. |
| Fastness to light: DIN 6167 scale | G 01, practically no yellowing | G 61 very strong yellowing. |

EXAMPLE 3

As described in Example 1, an ester interchange product with OH number about 99 is obtained by heating linseed oil and trimethylolpropane in the molar ratio of about 1:0.6 mol.

About 33.6 parts of polymerized toluylene-2, 4-diisocyanate having an isocyanate content of about 22.2% are dissolved in about 26.6 parts of methyl glycol ether acetate, heated to about 120° C. and reacted portion-wise with about 100 parts of the partial ester of linseed oil heated to about 140° C. After about 10 hours, about 107 parts of white spirit are added and heating is continued until isocyanate can no longer be detected. The pale yellow, clear approximately 50% solution (viscosity about 5500 cp./25° C.) contains about 40% of white spirit and about 10% of monomethylglycol ether acetate (lacquer 3a).

Clear lacquer 3a and lacquer 3b used for comparison, containing about 63% of linseed oil, about 12.5% of trimethylolpropane and about 24.5% of toluylene diisocyanate (80/20) are desiccated at a solids content of about 50% with about 0.015% Co, about 0.22% Pb and about 0.015% Mn calculated as metal on solvent free binder. A mixture of white spirit and methyl glycol ether acetate about 9:1 is used as solvent.

Lacquer 3a is found to be markedly superior in drying, hardening and fastness to light.

|  | Lacquer 3a | Lacquer 3b |
| --- | --- | --- |
| Drying (film thickness 35 μ): |  |  |
| Dust free (after Garmsen) | 20 minutes | 120 minutes. |
| Non tacky (tested with finger) | 80 minutes | 180 minutes. |
| Pressure resistance (tested with finger) | 3 hours | about 24 hours. |
| Film hardness: |  |  |
| (35 μ film thickness) after 1 day DIN 53157 | 63 seconds | 39 seconds. |
| Pendulum instrument of König: |  |  |
| After 3 days | 67 seconds | 51 seconds. |
| After 7 days | 68 seconds | 67 seconds. |
| Fastness to light, DIN 6167 scale | G 01, practically no yellowing | G 61, very strong yellowing. |

Lacquer 3a achieves almost its final hardness in only about 24 hours.

EXAMPLE 4

Soya bean oil is reacted with trimethylolpropane in the molar ratio of about 1:0.6 mol for ester interchange as in Example 1. The hydroxyl content of the partial ester is 2.96%.

By reaction with a toluylene-2, 4-diisocyanate polymer containing about 22.1% NCO (about 33 parts of polymer to about 100 parts of hydroxyl component), a urethane oil which contains isocyanurate groups is obtained (about 50% solids, about 40% white spirit, about 10% methyl glycol ether acetate, viscosity about 5000 cp./25° C.). This urethane oil, diluted and dried as in Example 1, shows surprisingly rapid hardening of the painted films and very good fastness to light.

Film hardness
(in seconds) DIN 53157 (pendulum instrument of König) 35μ thickness of painted film:
  After 1 day _____ 46
  3 days _____ 48
  10 days _____ 48

The final hardness of the film is reached surprisingly quickly, in practically about 24 hours.

Fastness to light, DIN 6167 scale:
  Tested after about 88 hours in the Fade-O-meter _____ [1] G01
  Tested after about 3 days xenon lamp _____ [1] G01

[1] No yellowing.

EXAMPLE 5

About 100 parts of ester interchange product according to Example 3 (OH number about 101.5) are heated to about 130° C. and added in three portions in the course of about 5 minutes to about 59 parts of a solution, also heated to about 130° C., of about 37.5 parts of copolymer of toluylene-2, 4-diisocyanate and hexane-1, 6-diisocyanate (proportions about 86.5% and about 13.5% by weight) in about 21.5 parts of methyl glycol ether acetate, no turbidity of the mixture occurring. Owing to spontaneous reaction, the temperature rises to about 150° C. After approximately a further 5 minutes, about 116 parts of white spirit which contains about 0.1 part of stannous octoate in solution are added and heating is continued for about one hour at about 130° C. until no further isocyanate can be detected in the solution which has a solids content of about 50%. After the addition of about 3% of n-butanol, the viscosity of the clear pale yellow solution is about 70,000 cp./25° C. After drying with Co-Pb-Mn-naphthenate, the urethane oil which contains isocyanate groups dries to form lacquer films which are resistant to yellowing.

EXAMPLE 6

As in Example 5, about 100 parts of ester interchange product of linseed oil and trimethylolpropane (OH number about 101.5) are reacted portion-wise at about 130° C. with about 56 parts of a solution of about 35.6 parts of an isocyanurate polyisocyanate which is a copolymer of toluylene-2, 4-diisocyanate and hexane-1, 6-diisocyanate (in proportions of about 93.3:6.7% by weight, containing about 0.45% free toluylene diisocyanate) in about 27.1 parts of methyl glycol either acetate, the temperature of the reaction mixture then rising to about 150° C. After the addition of about 108.5 parts of white spirit in which about 0.1 part of stannous octoate is dissolved, a solution containing about 50% solid substance is obtained, the solvent consisting of about 80% of white spirit and about 20% of methyl glycol ether acetate. After heating for about one hour at about 135° C., no further isocyanate can be detected. The viscosity of the clear pale yellow solution is about 38,000 cp./25° C. On addition of about 1% of n-butanol, the viscosity drops to about 22,000 cp./25° C.

After dehydration and application to substrates, the product rapidly hardens to coatings which are resistant to yellowing.

EXAMPLE 7

By dissolving about 70 parts of polymerized toluylene-2, 4-diisocyanate containing about 22% NCO in about 40 parts of methyl glycol ether acetate, a solution which contains about 13.7% NCO is obtained. About 100 parts of an ester interchange product according to Example 3 (OH number about 101) are combined portion-wise at about 130° C. with about 74 parts of polyisocyanate solution (about 30% excess of isocyanurate-polyisocyanate). After about 10 minutes, white spirit in which about 0.1 part of stannous octoate is dissolved is added in a quantity such that the solution contains about 50% solids, about 35% of white spirit and about 15% of methyl glycol ether acetate (viscosity about 34,000 cp./25° C.).

After dehydration, the material dries to very hard films which are resistant to yellowing and which are distinguished by their excellent resistance to alkalies.

EXAMPLE 8

Using the same starting materials as in Example 7, about 100 parts of hydroxyl components are reacted with about 62 parts of polyisocyanate solution, i.e. about 10% excess of polyisocyanate. After a reaction time of about 10 minutes, the isocyanate content of the reaction mixture is still about 0.5%. About 1 part of water is carefully added, and after heating for a short time no further isocyanate can be detected.

EXAMPLE 9

A partial ester (OH number about 45) is prepared by ester interchange between a mixture of ricinine oil and soya bean oil (about 1:1) and trimethylolpropane.

About 100 parts of partial ester are combined at room temperature, without the addition of a solvent, with about 17.15 parts of isocyanurate-polyisocyanate (19.75% NCO) obtained by polymerization of hexane-1,6-diisocyanate, the mixture is heated to about 130° C. After about half an hour, about 60 parts of white spirit are added, and after about a further ½ hour about 57 parts of the same solvent are added. After about 4 hours heating at about 130° C., no further isocyanate can be detected. The solution which has a solids content of about 50% has a low viscosity. Small quantities of flocculent precipitates are removed by filtration.

After dehydration, a relatively soft, non-yellowing film is obtained.

EXAMPLE 10

About 90 parts of a partial ester of a mixture of ricinine oil and soya bean oil (about 1:1) and trimethylolpropane (OH number about 45) are mixed with about 10 parts of a linear polypropylene ether glycol (OH number about 112). About 100 parts of this mixture is reacted at about 130° C. with about 28.6 parts of a solution, which contains about 13.6% of NCO, of polymerized toluylene-2,4-diisocyanate, containing about 22.4% NCO, in methyl glycol ether acetate. After about 5 minutes, about 108 grams of white spirit containing about 0.1 gram of stannous octoate are added and the reaction mixture is heated for another hour at about 130° C. until no further isocyanate can be detected. The solution consists of about 50% of solids, about 4.4% of glycol ether acetate and about 45.6% of white spirit.

After desiccation and drying, an elastic film resistant to yellowing is obtained.

EXAMPLE 11

If about 99 parts of the same partial ester as in Example 10 and about 1 part of 2-dimethyl-propylene glycol are mixed and reacted with about 30.4 parts of isocyanurate polyisocyanate solution, then a urethane oil is obtained which hardens to form comparatively inelastic coatings.

It is to be understood that the foregoing working examples are given for the purpose of illustration and that any other suitable polyester, isocyanurate, solvent, catalyst or the like could have been used therein provided that the teachings of the disclosure are followed.

Although the invention has been described in considerable detail for the purpose of illustration, it is to be understood that variations can be made by those skilled in the art without departing from the spirit of the invention and scope of the claims.

What is claimed is:

1. A urethane oil which comprises the reaction product of an isocyanurate prepared from only toluylene diisocyanate and having free NCO groups and a polyhydroxyl polyester having ethylenic unsaturation.

2. The urethane oil of claim 1 wherein said polyhydroxyl polyester is an ester of an ethylenically unsaturated fatty acid.

3. The urethane oil of claim 1 wherein said polyhydroxyl polyester is prepared by ester interchange of a drying or semi-drying vegetable oil with a polyhydric alcohol.

4. The urethane oil of claim 1 wherein said isocyanurate is the trimer of three mols of toluylene diisocyanate.

5. The urethane oil of claim 1 wherein said isocyanurate having free NCO groups contains from about 17.2 to about 24.1% by weight of free NCO groups.

6. The urethane oil of claim 1 wherein said polyhydroxy polyester and said isocyanurate containing free NCO groups are reacted together in such proportions that the NCO to OH ratio is from about 0.8 to about 1.5.

7. The urethane oil of claim 1 wherein said polyhydroxyl polyester has an hydroxy content of from about 1.5 to about 5%.

References Cited

UNITED STATES PATENTS

| | | | |
|---|---|---|---|
| 2,978,449 | 4/1961 | France et al. | 260—248 |
| 3,045,034 | 7/1962 | Zankl et al. | 260—404.5 |

ALLAN LIEBERMAN, *Primary Examiner.*

H. H. FLETCHER, *Assistant Examiner.*

U.S. Cl. X.R.

260—22, 77.5, 248, 404.5